US009135795B2

(12) United States Patent
Ben-Hamozeg et al.

(10) Patent No.: US 9,135,795 B2
(45) Date of Patent: Sep. 15, 2015

(54) SENSOR FOR TAUT WIRE FENCES

(71) Applicant: MAGAL SECURITY SYSTEMS LTD., Yahud (IL)

(72) Inventors: Yehonatan Ben-Hamozeg, Rosh Ha'Ayin (IL); Avraham Saar, Holon (IL); Avi Shaham, Herzliya (IL)

(73) Assignee: Magal Security Systems Ltd., Yahud (IL)

( * ) Notice: Subject to any disclaimer, the term of this patent is extended or adjusted under 35 U.S.C. 154(b) by 0 days.

(21) Appl. No.: 13/898,453

(22) Filed: May 20, 2013

(65) Prior Publication Data

US 2013/0247661 A1 Sep. 26, 2013

Related U.S. Application Data

(63) Continuation-in-part of application No. 13/817,688, filed as application No. PCT/IL2011/000665 on Aug. 16, 2011, now abandoned.

(30) Foreign Application Priority Data

Aug. 19, 2010 (IL) .......................................... 207723

(51) Int. Cl.

*G01P 1/02* (2006.01)
*G08B 13/02* (2006.01)
*E04H 17/10* (2006.01)
*G08B 13/12* (2006.01)

(52) U.S. Cl.

CPC ................ *G08B 13/02* (2013.01); *E04H 17/10* (2013.01); *G08B 13/122* (2013.01)

(58) Field of Classification Search

CPC ...... G08B 13/02; G08B 13/12; G08B 13/122; G08B 13/1436; A01K 3/00

USPC .................. 73/493, 503.3, 504.03, 509, 510, 73/514.02

See application file for complete search history.

(56) References Cited

U.S. PATENT DOCUMENTS

| | | | | | |
|---|---|---|---|---|---|
| 4,155,083 | A | * | 5/1979 | Slaats et al. | 340/666 |
| 4,367,459 | A | * | 1/1983 | Amir et al. | 340/541 |
| 4,533,906 | A | * | 8/1985 | Amir | 340/541 |
| 4,643,400 | A | * | 2/1987 | Porat | 256/52 |
| 4,680,573 | A | * | 7/1987 | Ciordinik et al. | 340/541 |
| 4,683,356 | A | * | 7/1987 | Stoler | 200/61.93 |
| 4,730,809 | A | * | 3/1988 | Stoler | 256/1 |
| 4,803,468 | A | * | 2/1989 | Seifert | 340/566 |
| 4,829,286 | A | * | 5/1989 | Zvi | 340/541 |
| 4,829,287 | A | * | 5/1989 | Kerr et al. | 340/541 |
| 4,929,926 | A | * | 5/1990 | Porat | 340/541 |
| 5,103,207 | A | * | 4/1992 | Kerr et al. | 340/541 |
| 5,578,990 | A | * | 11/1996 | Sanford et al. | 340/541 |
| 5,852,402 | A | * | 12/1998 | Perry | 340/541 |

(Continued)

*Primary Examiner* — Laura Martin
*Assistant Examiner* — Samir M Shah
(74) *Attorney, Agent, or Firm* — Rodney J. Fuller; Booth Udall Fuller, PLC

(57) ABSTRACT

A sensor for an intrusion detection fence of a taut wires type and a method implemented in its operation, wherein the sensor is a multi-axes accelerometer that is installed on the sensors' pole of the fence while inclined relative to the fence taut wire unto which it is connected, and the sensor is connected to fence taut wire via a movement converting means such that from an instant of loading the taut wire as happens when an intrusion attempt through it occurs, the movement converting means converts the movement of the taut wire unto a rotational movement of the sensor that is amenable to be sensed in at least two axes.

16 Claims, 7 Drawing Sheets

(56) References Cited

U.S. PATENT DOCUMENTS

Figure 1:
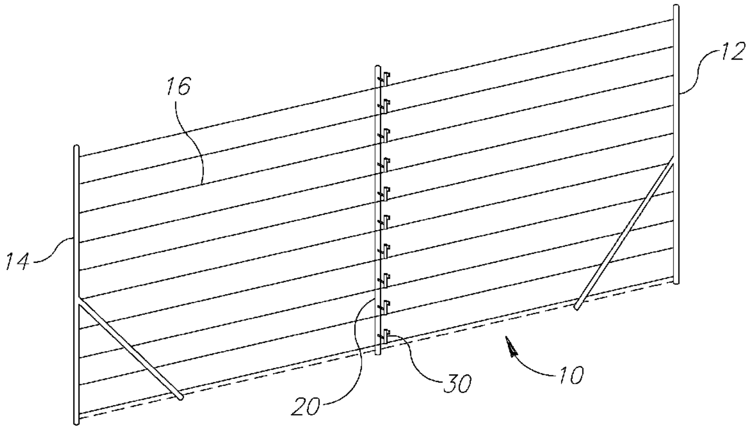

| | | | | |
|---|---|---|---|---|
| 5,914,882 | A * | 6/1999 | Yeghiazarians | 700/177 |
| 6,578,438 | B2 * | 6/2003 | Steinberg et al. | 73/862.381 |
| 6,583,721 | B1 * | 6/2003 | Dank et al. | 340/548 |
| 6,646,551 | B2 * | 11/2003 | Perry | 340/564 |
| 6,836,213 | B1 * | 12/2004 | Perry | 340/564 |
| 6,891,472 | B2 * | 5/2005 | Tallman | 340/541 |
| 7,293,460 | B2 * | 11/2007 | Zarabadi et al. | 73/514.32 |
| 7,384,211 | B2 * | 6/2008 | Wong | 404/6 |
| 7,466,228 | B2 * | 12/2008 | Wong | 340/541 |
| 7,880,612 | B2 * | 2/2011 | Caswell | 340/571 |
| 7,889,075 | B2 * | 2/2011 | Winkler et al. | 340/550 |
| 7,959,131 | B2 * | 6/2011 | Easley et al. | 256/10 |
| 8,484,066 | B2 * | 7/2013 | Miller et al. | 705/7.28 |
| 8,680,997 | B2 * | 3/2014 | Gallagher | 340/550 |
| 2004/0046661 | A1 * | 3/2004 | Vaccaro et al. | 340/557 |
| 2004/0113780 | A1 | 6/2004 | Pottratz | |
| 2006/0207328 | A1 * | 9/2006 | Zarabadi et al. | 73/514.32 |
| 2008/0074257 | A1 * | 3/2008 | Easley et al. | 340/541 |
| 2009/0201190 | A1 * | 8/2009 | Huthoefer et al. | 342/27 |

* cited by examiner

SENSOR FOR TAUT WIRE FENCES

RELATED U.S. APPLICATION DATA

This application is a continuation-in-part of application Ser. No. 13/817,688, filed on Feb. 19, 2013, which is the U.S. National Phase of International Application No. PCT/IL2011/000665 filed on Aug. 16, 2011, which claims the benefit of Israel Application No. 207723, filed on Aug. 19, 2010. The entire content of each listed application is expressly incorporated herein by reference thereto.

FIELD OF THE INVENTION

The present invention, the subject matter of this application, is found in the field of sensors for intrusion detection fences in general, and focuses on fences that are of the taut wire genre—in particular.

BACKGROUND OF THE INVENTION

Intrusion detection fences of the type known as “taut wire warning fence” are already known. A typical sector of a taut wire fence includes a couple of anchoring poles, wherein the distance (i. e., space) between them delineates a sector of the fence. Between each of such couple of anchoring poles the wires of the fence (that might be—but not necessarily—of the barbed wire type) are taut. They are at a designated vertical distance one from the other, thus forming a kind of a virtual surface (a plane), defining an area of parallel horizontal wires that is perpendicular to the ground.

The wires that are taut, as said, between given couples of anchoring poles, form a kind of transmission (or communication) lines that provides indications of the occurrence of an intrusion incident (or an attempted one) through them. A change in the tension in a wire of the fence—such as happens while bending or severing the taut wire, that would happen as a result of an actual intrusion occurrence or an attempted one (for example climbing on the wires, trying to push away parallel adjacent wires in order to increase the distance between them to enable passage or using cutters on them to cut the wires), any such occurrence is “transmitted” as an amenable to be sensed indication through the usually taut wire, like a (musical) “string”.

The amenable to be sensed indication, as an outcome of the change that occurred in the tension of the wire—is received (sensed) by one sensor or more, that is (are) linked to the taut wire. The sensor, in due course, generates (produces) an electrical signal that can be received and analyzed at a remote control center.

An example for such intrusion detection fence of the taut wire fence type, is the commercially available and marketed fence, denoted DTR—that is manufactured and marketed by the applicant of this present patent (check their site—http://www.magal-s3.com/products).

A typical sector of a DTR fence includes plurality of barbed wire cords that are deployed with a distance of nine (9) to twenty (20) cm one from the other, wherein they are taut between a couple of anchoring poles that are located at a typical distance of approximately fifty (50) meters one from the other. A number of sensors are installed on “a sensors’ pole” that is positioned approximately at the half point distance located between the two anchoring poles.

In addition, between every two (couple of) anchoring poles, there might be located also one or more “sliding poles”, e.g.—spiral like poles, that enable horizontal movement of the wires on them but at the same time and in all that is concerned with loading the wires for bending, the sliding poles define and delineate relatively small support spaces, in a manner that forces increasing the effort that have to be exerted for bending the wires, and naturally, in a manner that increases the amenability to be sensed variation of the tensions in the bent wire. In a DTR fence, each couple of taut wires is allocated to one sensor and is connected with it. A sensors’ pole is installed with six groups of sensors at most, so that the taut wires’ plane of the fence might include several “Sensing Slices”. Dividing the height of the pole into a number of “Sensing Slices” enables to run separately an analysis of the received signals from each of the sensors’ groups, and in a manner that imparts high capability of identifying an intrusion attempt by climbing on the wires of the fence (for example—indication in a configuration of a continuum of signals from several “Sensing Slices” that are positioned one on the top of the other, and that are received successively, one after the other.

However, the sensors’ pole in a DTR fence and the sensors that are installed on it, do not provide signals that enable to identify the exact location in space of the intrusion occurrence as it is related relative to the sensors’ pole proper (for example—whether the intrusion attempt that is made by climbing on the fence, as we stated above, is taking place in the taut wires plane positioned to the right of the sensors’ pole, or whether it occurs to the left of that sensors’ pole).

Moreover, each one of the sensor groups by itself does not enable analyzing the group’s produced signals at the specific individual sensor level, because the connection of the sensors in each group is done in series. In other words—the warning that is received relates to a given group of sensors and there exists no capability of discerning which is the single specific sensor that triggers the alarm within a given group.

The sensors that are installed nowadays in a DTR fence are of the “short/cut-off” binary sensors type (bi-state: go/no go). A variation in the tension of whichever wire it is from the couple (two) wires unto which the sensor in the DTR fence is connected, might extract the sensor from the state that it is regularly found in (for our presentation—shorted) and pass it to other state—namely cut-off, in a manner so that the control system that is all the while sampling the status of the sensors, might identify only the fact of the occurrence of an intrusion attempt through the fence, via the specific group of sensors.

A variation in the tension of a taut wire that, as said, brings about a change of state in a sensor (from short circuit to cut-off) is the outcome of actuating a certain weight on the wire unto which that sensor is connected (except in the case of severing (cutting) the wire). In other words, the sensor changes its status at the time that a wire unto which it is connected is loaded beyond a given weight threshold. The level of sensitivity of the sensor is constant (in accordance to the weight unto which the wire is exposed and wherein it is sufficient for switching over the sensor from short circuit state to cut-off).

Thus, the sensors that are installed nowadays in a DTR fence, do not provide (issue) signals that enable to deduce information regarding the value (magnitude) of the weight that is operating on the wire before an alarm is sounded (before the switching over from a short (circuit) state to cut-off), and afterwards (following the sensor’s switched from short (circuit) state to cut-off).

The sensors that are installed nowadays in a DTR fence also do not provide indications from which it might have been possible to estimate the way travelled by the wire that was subjected to the variation of the tension, nor the direction of this path (track) in space. At most, it is possible to estimate that the switching over of the sensor from short circuit state to cut-off, is the outcome of the loading of the wire and its bending in the plane of the wires, to within a shift of approximately 10 to 12 cm in a vertical direction (relative to the ground).

As for the sensors, that are as said binary (by-state) "switching over sensors" from connecting to cut-off, the sensors that are nowadays installed in a DTR fence are also not able to identify occurrences of appearance of vibrations in the wires, but only the occurrence of a steady pulling action on the wire as it happens due to loading the wire unto a certain weight (except if it is considered to be cutting the wire).

However, to intrusion efforts through such taut wires fences, there might be accompanying occurrences of vibrations in the wires that do not rise (increase) up to an occurrence of a steady pulling force on the wire (for example, an intrusion act by setting a kind of a rigid frame (window like) on the wires of the fence, thus maintaining their tautness—and as its second stage—cutting the wires that are found inside this frame).

It is important to note, that also the substantial physical size (dimensions) of the sensors that are installed nowadays in the DTR fences, constitute a limitation because it does not enable to deploy them at a beneficial crowded arrangement of taut wires such that variations of tautness on all of them would be amenable to be sensed.

Thus, before the invention that is the subject matter of this application, when using intrusion detection fences of the taut wire genre, it was not feasible to obtain the desired combination of beneficial indications—

Both for the location wherein the intrusion attempt occurs in relation to the sensor (does it occur to its right or rather to its left); determining the specific sensor producing the alarm from the group of sensors to which it belongs, and, as was said—in a dynamic mode and for prolonged time spans—applying to the varying weight unto which the wire is loaded during the time of the intrusion attempt, its direction in space and the path that the wire goes through during the attempted intrusion; as well as indications concerning vibrations appearances unto which the wire might be exposed as a result of the intrusion attempt through it.

An additional drawback, due to the (relatively) large physical dimensions of the sensors, there exists in the intrusion detection fences of the taut wire fence type, a geometrical and packaging constraint limitation from the aspect of the capability of crowded deployment of taut wires with complete utilization of their capability to serve simultaneously—all of them, as an active "communication lines", transferring indications regarding the occurrences of intrusion attempts through them to the sensors that are connected to them.

SUMMARY OF THE INVENTION

The invention, the subject matter of this application, is expressed by implementing a compact, multi-axes accelerometer as the sensor of an intrusion detection taut wire fence, and linking the accelerometer to the taut wire to which it is allocated, by a mechanical means that from the instant of loading the taut wire (as happens at the time that an attempted penetration through it being executed), would convert the shift (movement) of the wire into a movement of the sensor, wherein it can be sensed in all of the accelerometer axes.

As per one aspect of the present invention, there are embodied in an intrusion detection fence of the taut wire fence type, that usually includes a couple of anchoring poles that are positioned at a certain distance one from the other, wires that are stretched taut between the two anchoring poles, at least one sensors' pole that is positioned between said two anchoring poles and at least one sensor that is installed on the sensors' pole and connected to at least one of the taut wires for sensing such phenomenon that accompanies the intrusion attempt through the fence. Such a well-known taut wire fence, that in accordance with the invention is characterized by that that the sensor is a multi-axes accelerometer that is installed on the sensors pole, and is connected to the taut wire by a means that from the instant (time) of loading the taut wire (as happens at the time of an attempted intrusion through it occurred), would convert the shift (movement) of the wire into a movement of the sensor, wherein it can be sensed in all of the accelerometer axes.

As per a second aspect of the present invention, it is embodied in a sensing assembly with a multi-axes accelerometer for being used as a sensor to an intrusion detection fence of the taut wire type. An assembly that comprises a base means for installing the sensing assembly on a sensors' pole, and a movement converting means that from the instant of loading the taut wire (as happens at the time wherein an attempted intrusion through it occurs), would convert the shift (movement) of the wire into a movement of the sensor, wherein it can be sensed in all of the accelerometer axes.

In a third aspect of the present invention, it is embodied as a generic method for sensing attempted intrusions through intrusion detection fences of the taut wire fence type, a method that comprises the steps of connecting a multi-axes accelerometer unto a taut wire of the fence, and converting the shift (movement) of the wire into a movement of the accelerometer wherein it can be sensed in the accelerometer axes.

BRIEF DESCRIPTION OF THE ACCOMPANYING FIGURES

The present invention will be described herein in conjunction with the accompanying figures. Identical components, wherein some of them are presented in the same figure—or in case that a same component appears in several figures, will carry an identical number.

FIG. 1 constitutes a schematic view in perspective of an example of a typical segment of an intrusion detection fence of the taut wire type in accordance with the invention.

Figure 2:
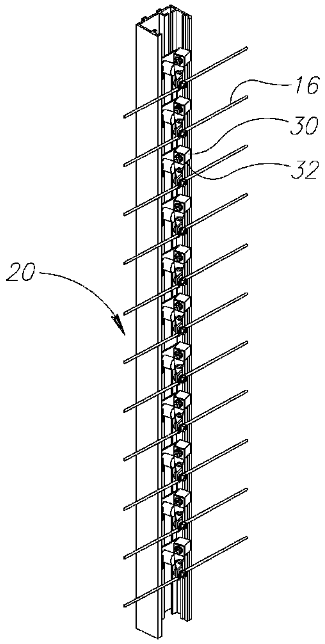

FIG. 2 constitutes a close-up view of the sensor' pole in the fence that is illustrated in FIG. 1.

Figure 3:
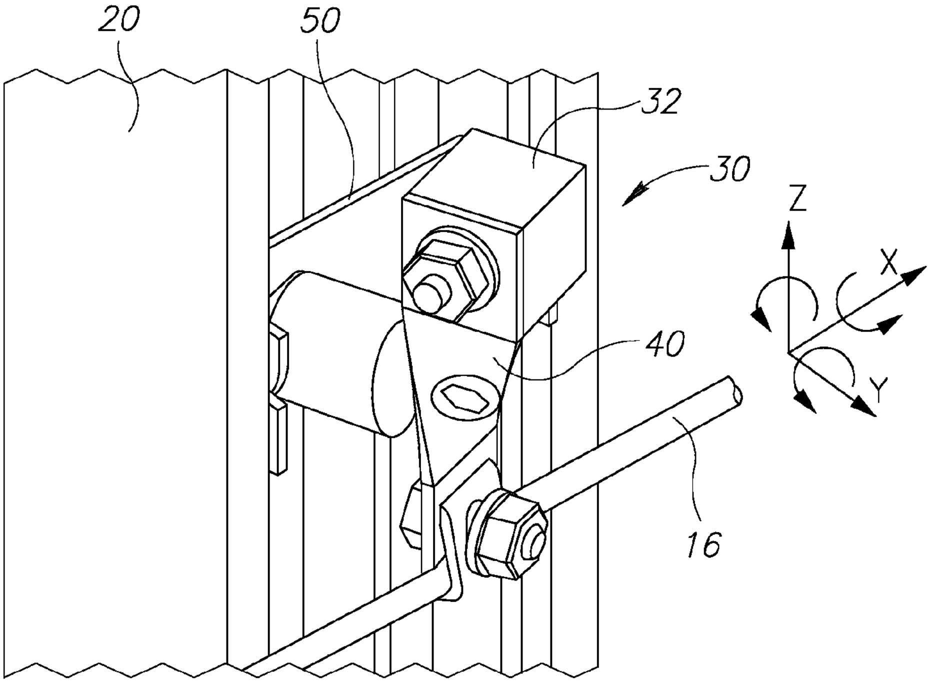

FIG. 3 constitutes a close-up view of a sensing assembly that is installed on the sensors' pole that is illustrated in FIG. 2.

Figure 4:
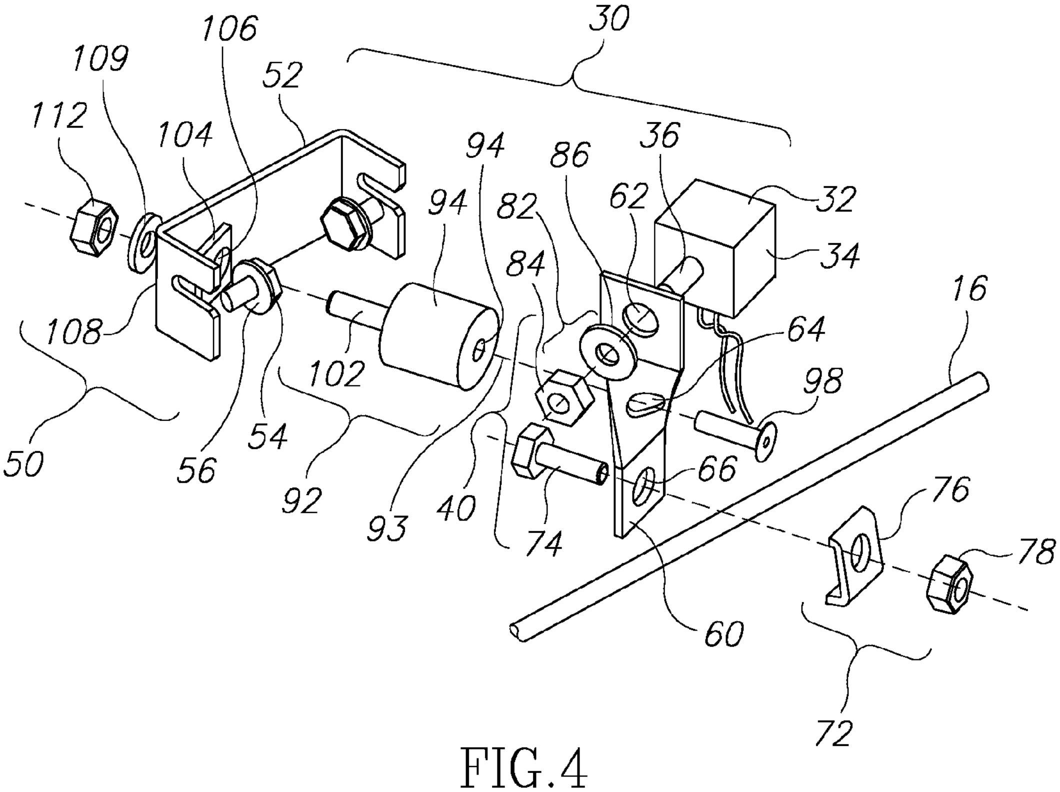

FIG. 4 constitutes an exploded view of the components of the sensing assembly that is illustrated in FIG. 3.

Figure 5:
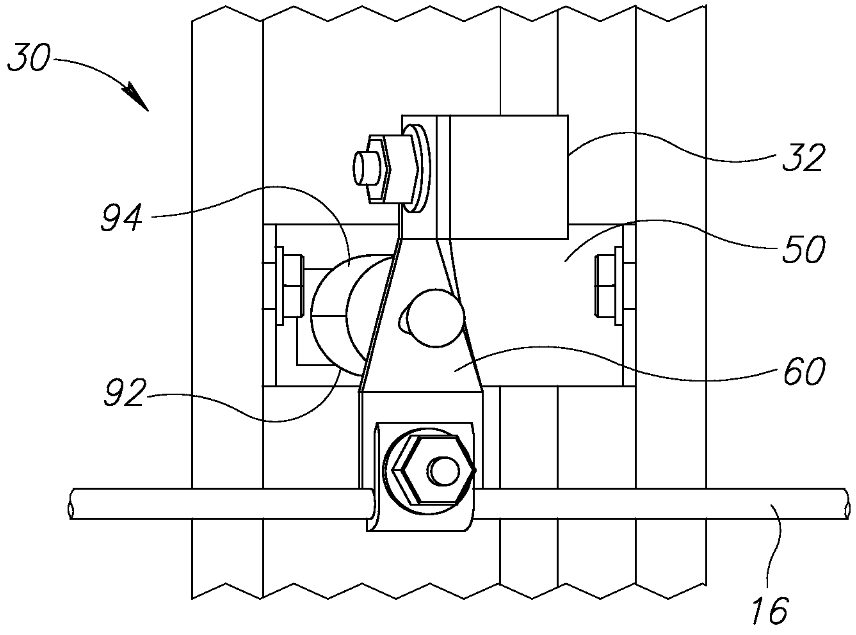

FIG. 5 constitutes a front view of an example of a sensing assembly in accordance with the invention when it is found (maintained) at its "paused" state.

Figure 6:
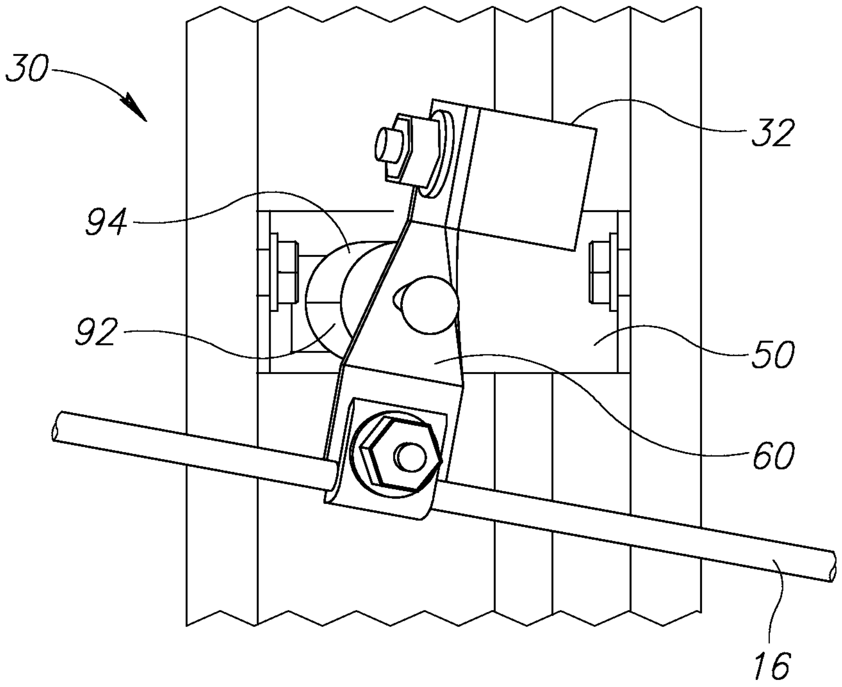

FIG. 6 constitutes a front view of an example of a sensing assembly in accordance with the invention that is the illustrated in FIG. 5, wherein the assembly is at its operating state—from the instant of loading the taut wire as it occurs at a time of an intrusion attempt through it and converting the wire's movement into a rotational movement of the accelerometer that is amenable to be sensed in all its three axes.

Figure 7:
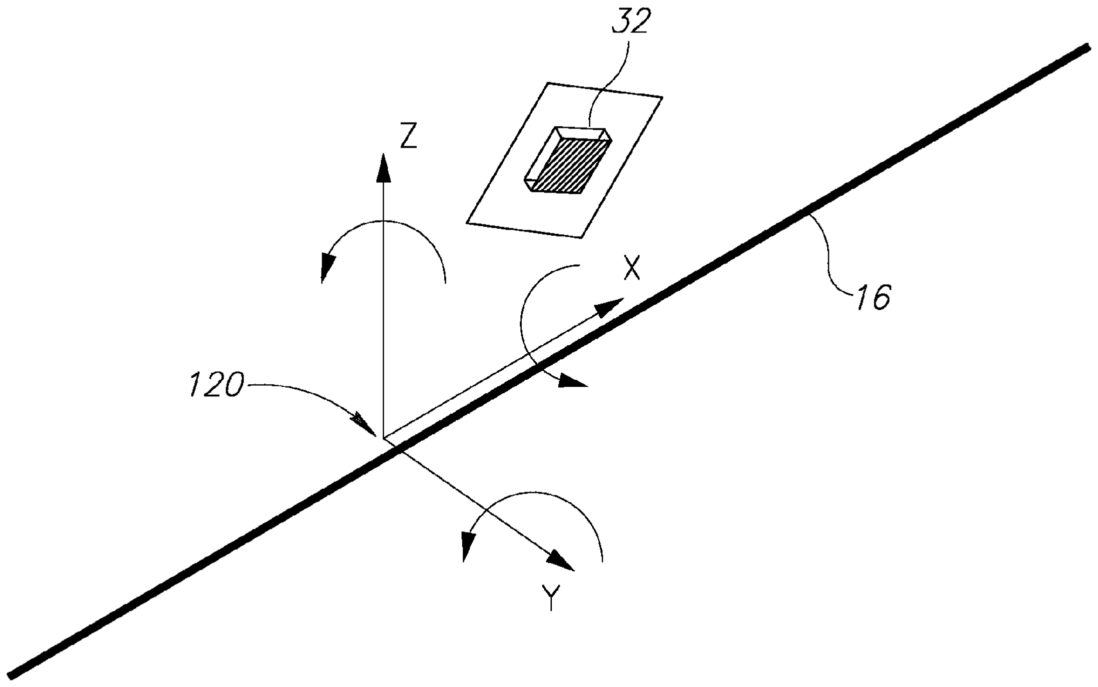

FIG. 7 constitutes a schematic illustration of the positioning characteristic of the accelerometer wherein it is inclined relative to the taut wire unto which it is connected, wherein—in the illustrated figure, the accelerometer is a tri-axis accelerometer inclined in all his three axes.

Figure 8:
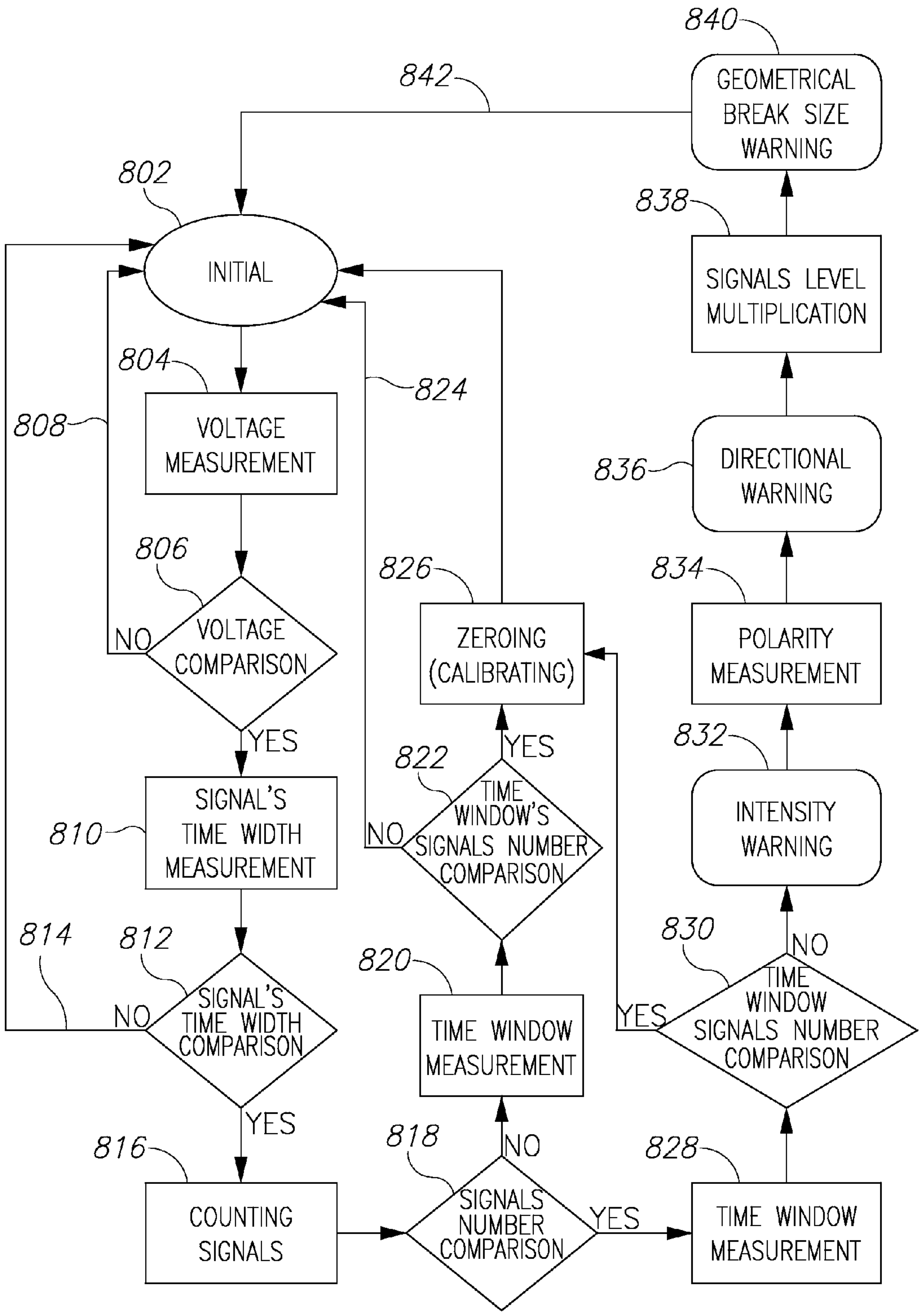

FIG. 8 constitutes a flow chart of an example of an algorithm for processing signals that are received from a sensing assembly in accordance with the invention.

Figure 9:
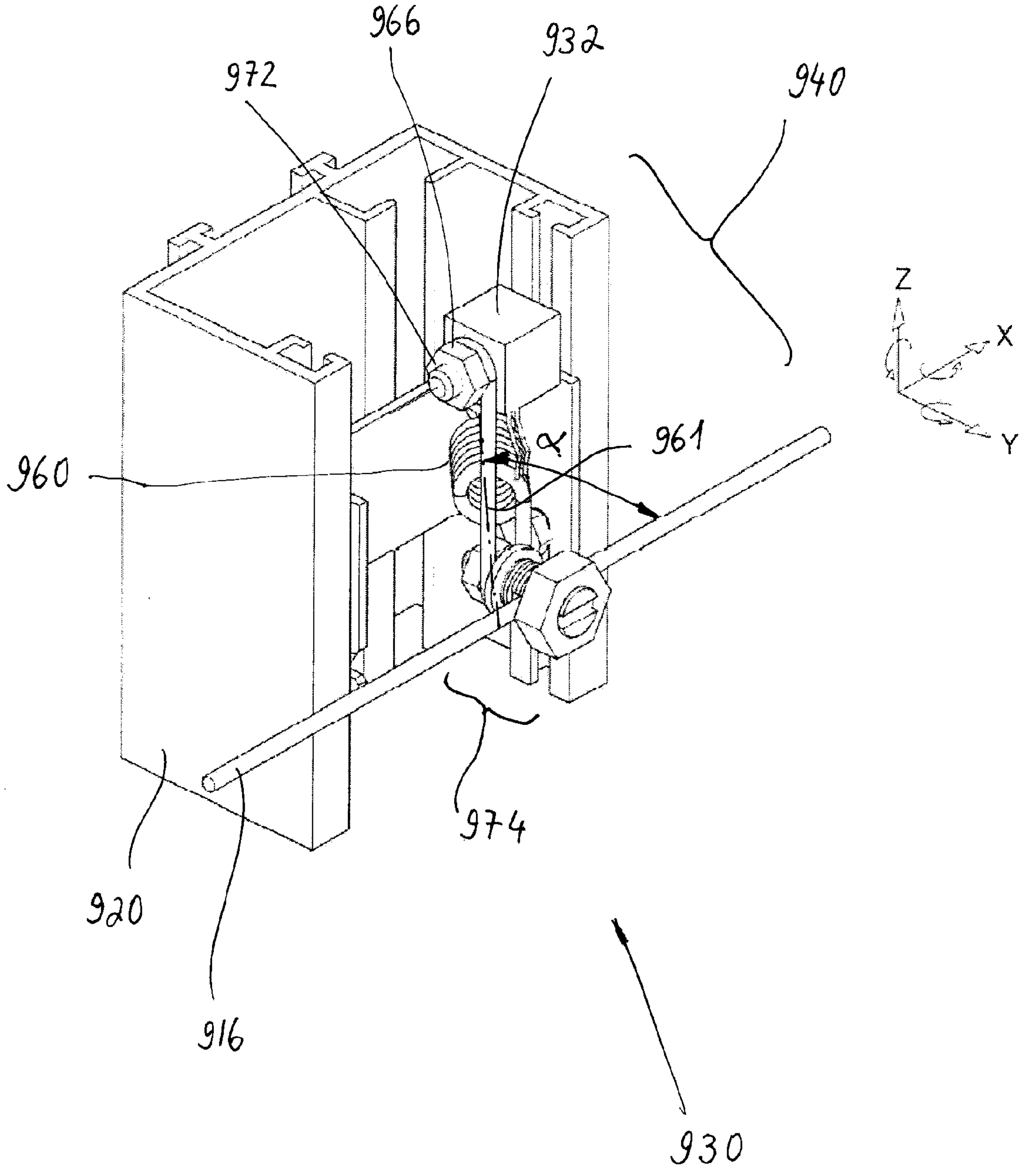

FIG. 9 constitutes a close-up view of a second embodiment of a sensing assembly that is installable on the sensors' pole that is illustrated in FIG. 2.

Figure 10:
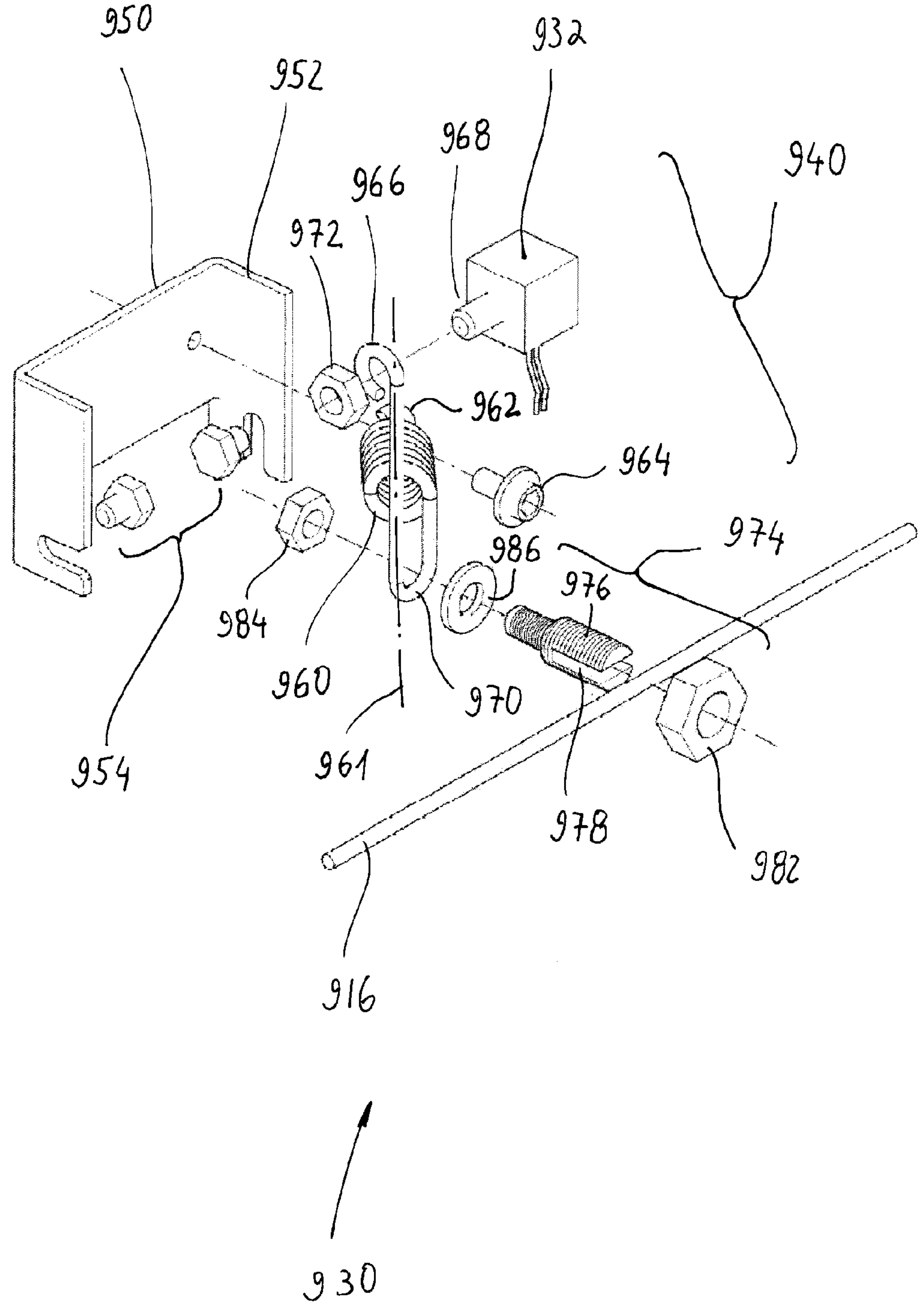

FIG. 10 constitutes an exploded view of the components of the sensing assembly that is illustrated in FIG. 9.

DETAILED DESCRIPTION OF A PREFERRED EMBODIMENT OF THE INVENTION

Reference is being made to FIGS. 1 to 3. FIG. 1 constitutes a schematic view in perspective of a typical segment of an intrusion detection fence 10 in accordance with the invention. FIG. 2 constitutes a close-up view of the sensor' pole 20 of fence 10 that is illustrated in FIG. 1. FIG. 3 constitutes a close-up view of a sensing assembly 30 that is installed on the sensors' pole 20.

Any professional would understand that intrusion detection fence 10 is a taut wire fence that comprises recognized and known components—a couple of anchoring poles 12, 14 at a distance one from the other, wires 16 that are stretched taut between the couple of anchoring poles 12, 14, at a distance one from the other, sensors' pole 20 that is located between the couple of anchoring poles 12, 14, and a plurality of sensing assemblies 30 that are installed on sensors' pole 20, and—in the illustrated example, each one of them is linked to one of the stretched taut wires 16 for sensing phenomena that are accompanying an intrusion attempt through fence 10

Any professional would also understand that there might exist other (i. e., different) configurations of a segment of the fence, for example—there might be installed several poles carrying sensors between a given pair (couple) of anchoring poles or that any of the sensing assemblies would be linked to more then one single taut wire (directly or through a common actuator), sliding poles (for example—in a spiral like shape)—might also be positioned between the pair of anchoring poles and part of the wires of the fence might be there solely as a physical barrier (namely might be devoid of any link to a sensing assembly).

In any case, intrusion detection fence 10 is characterized by that that in each of the sensing assemblies 30 there is installed a sensor 32 that is of the multi-axes accelerometer type (in the illustrated example—a tri-axes accelerometer), that is installed wherein in the illustrated example it is inclined relative to a wire 16 unto which it is connected.

In this configuration of the invention, a tri-axes accelerometer is installed wherein it is inclined in a spatial position in all of its three axes relatively to the taut wire unto which it is connected (namely it is inclined in comparison to the tri dimensional axes system in a spatial position wherein it is defined by the lengthwise axis of the taut wire unto which it is linked, the axis that is perpendicular to the fence's taut wires plane and to the axis that is parallel to the plane of the taut wires of the fence. See further explanations below when referring to FIG. 7).

An example of a feasible implementation to such a sensor might be an Analog Devices ADXL 327 (see the specifications at the following cite: http://www.analog.com/en/sensors/interial-sensors/adx1327/products/product.html) in conjunction with an evaluation board of an Analog Devices EVAL-ADXL327Z unit (its specifications are given in the data sheet found in: http://www.datasheetpro.com/1143147_download_ADXL327_datasheet.html), but any professional would understand that also other and different types of multi-axes accelerometers might be suitable for accomplishing the required operation.

Accelerometer 32 that is installed in sensing assembly 30 is connected to wire 16 by a movement converting means 40.

Sensing assembly 30 includes in addition also base means 50 for installing assembly 30 on the a spatial position, wherein—in accordance with this configuration of the invention, it is installed so that it is inclined on all its three axes relative to the taut wire 16 unto which it is allocated.

Let's refer to FIG. 4. FIG. 4 constitutes an illustrated exploded view of the components of sensing assembly 30.

Sensing assembly 30 comprises as said an accelerometer 32 that in the illustrated example is packaged within housing assembly 34, whose—from its end, there protrudes a threaded rod 36. Any professional would understand that housing assembly 34 enables sealed packaging (for example inside an epoxy casting) of the accelerometer.

Sensing assembly 30 includes as said, base means 50. In the illustrated example, base means 50 includes component 52 of a rather U-shaped form, wherein any professional would understand that it might be formed from tin by bending. Component 52 is suited to be installed on sensors' pole 20 by an array (assembly) of two screws 54 and discs 56.

Sensing assembly 30, as said, includes also the movement converting means 40. Movement converting means 40 includes a component 60 that is formed as a twisting (winding) stripe with two ends and with a central segment. In the illustrated example, the presented subject is some kind of a twisting element that—as any professional would understand, may be formed from tin by bending. Component 60 is formed with bores 62, 64 and 66 (respectively) at its two ends and at its central segment.

Movement converting means 40 includes in addition means 72 that serves for connecting (linking) one end of twisting stripe 60 to taut wire 16. In the illustrated example, we are treating an array (assembly) of a screw 74, tightening discs 76 and a nut 78, that enables harnessing taut wire 16 to twisting stripe 60 (via bore 66).

Movement converting means 40 includes in addition, also a means 82 for anchoring accelerometer 32 at the other end of twisting stripe 60. In the illustrated example, the treated subject is the nut 84 and disc 86 array, that enables harnessing housing assembly 34 to twisting stripe 60 (using threaded pole 36 that is suited to pass through bore 62 and to be tightened on its other end).

Moreover, movement converting means 40 includes in addition also a springy axis means 92 that defines an axis 93—and in the illustrated example, it includes elastomeric component 94 that is formed around axis 93.

One end of springy axis means 92 is suited to be affixed unto the central segment of twisting stripe 60. In the illustrated example, this is done by a threaded bore 96 that is formed on one end and that is suited for threading screw 98 into it via bore 64, and thus brings about a tightening of the central segment of twisted stripe 60 unto the springy axis 92, in a manner wherein rotational movement of the twisting stripe component 60 is enabled around axis 93.

The other end of springy axis means 92 is suited to be affixed to base means 50. In the illustrated example, springy axis means 92 is suited as said, to be affixed unto base means 50, via threaded rod 102 that is formed projecting from the other end of springy axis means 92. Threaded rod 102 is suited to pass through an angular directing means 104 (in the illustrated example—a small bent tin piece). Angular directing means 104 is adapted to be supported by U-shaped formed component 52 and formed with through-pass bore 106. Threaded rod component 101 is adapted in its dimensions to continue and pass also through pass-through bore 108 (not shown in the illustrated figure) that is formed in component 52 and to be tightened on its both sides by the disk 109 and nut 112 array.

Reference is being made to FIGS. 5 and 6. FIG. 5 constitutes a front view of an example of a sensing assembly 30 in accordance with the invention wherein it is found (maintained) at its "paused" state. FIG. 6 constitutes a front view of an example of the same sensing assembly 30, wherein the assembly is at its operating state—from the instant of loading taut wire 16 as it occurs at a time of an intrusion attempt through it and converting the wire's movement into a rotational movement of accelerometer 32, that is amenable to be sensed in all its three axes.

At its "paused" state, accelerometer 32 would be installed in a spatial position, wherein in accordance with the preferred configuration of the invention—accelerometer 32 is inclined in its entire three axes relative to taut wire 16 unto which it is connected. This implementation in spatial position is obtained by forming twisting stripe 60 in a manner that one of its ends is connected, as said, to taut wire 16, whereas accelerometer 32 is anchored to twisting stripe 60 other side, which is twisted in its direction relative to said twisting stripe 60 first end, and in combination that defines the rotation axis of twisting stripe 60, perpendicular to another and additional plane of twisting stripe 60 (the plane of the central intermediate segment of /wisting stripe 60) and this—by springy axis means 2 and base means 50.

In the operating stage, from the instant of loading taut wire 16 (as it happens at the time of an attempted intrusion through it occurred), movement converting means 40 would convert the shift (movement) of wire 16 into a rotational movement of accelerometer 32, wherein it can be sensed in all of its three axes. The rotational movement is performed around axis 93 of springy axis means 92 (see FIG. 4), wherein from the instant that the taut wire moves, elastomeric component 94 instills a springy operation unto means 92 in a manner that upon termination of the movement, movement converting means 40 will revert to its original "paused" state.

Let's refer to FIG. 7. FIG. 7 constitutes a schematic illustration of the positioning characteristic of accelerometer 32 wherein in accordance with this configuration of the invention, it is inclined in its entire three axes relative to the taut wire 16 unto which it is connected.

The implementation—in accordance with the invention, of an accelerometer as a sensing means, enables to obtain a unique electric signal for every occurrence of touching the taut wire (namely—pulling, vibration, movement and passing through it). Furthermore, when as said, the subject discussed is an accelerometer that is a tri-axes type, the tri-axes accelerometer would generate three electric voltages as per its three axes in accordance with the initial location of the accelerometer and these signals can be sampled by a signal processing unit and furthermore it is feasible to store them and keep them in a voltages calibration table. A passage of the accelerometer from its initial position in a spatial position to another position would lead to producing different voltages in the three axes (enabling to compare them to the voltages that were measured at their initial locations).

Hence, any professional would understand that in this embodiment (configuration) of the invention the accelerometer is a tri-axis accelerometer already installed wherein it is inclined in a spatial position in all its three axes.

In other words—on referring to the three dimensional Cartesian system of axes 120, wherein its origin (of the axes) is defined by a taut wire 16 and the plane in which the wires of the fence are deployed, namely—X axis along the taut wire, Y axis perpendicular to the plane constituting the taut wires fence and the Z axis downwards parallel to the plane of the deployed taut wires fence. Loading taut wire 16, as happens when an attempted intrusion (or an act of harming the fence) occurs, would lead to said rotational movement of accelerometer 32, a rotational movement that would be amenable to being sensed in case of a tri-axis accelerometer such as accelerometer 32, in all the three axes of the accelerometer.

Even in a case of a typical intrusion attempt, such as climbing on the taut wires fence or breaking them apart, in a manner that naturally is accompanied with loading the taut wire to be bent downwards (direction of the ground), namely—in a way that leads to bi-directional loading of the taut wire along its length (X axis) and downwards (Z axis)—then the position in the spatial position of a tri-axes accelerometer would subject the accelerometer to a rotational movement in a manner that it will be possible to receive signals from all its three axes.

The spatial positioning of accelerometer 32 and the resulting rotational movement from the instant of an attempted penetration through the taut wire to which it is connected (in a manner that it would produce (generate) signals from all its three axes), were described above and when referring to the accompanying figures, for one implementation example. Any professional would understand that the above mentioned functions might be obtained also by other and different means (for example—movement converting means that are not in the configuration of a bent stripe but, say, formed by casting, springy means that is based on a leaf spring item, spiral spring or discs that are also springy and not depending on an elastomeric component as described above, different systems (arrays) for anchoring, additional means for sealing and protecting the sensing assembly).

Any professional would also appreciate the fact that in the invention there is embodied a generic method for sensing attempted intrusion acts through a taut wires intrusion detection fence. It is a general method that comprises the steps of connecting a multi-axes accelerometer to a tout wire of the fence (in the example described above while referring to the accompanying FIGS. 1-7—linking tri-axis accelerometer 32 to taut wire 16). At its final step the method implements the step of converting the movement of the taut wire—as it occurs when there is an intrusion attempt through it, into a movement of the accelerometer that is amenable to being sensed in the accelerometer's axes. In the cited example—converting the movement of taut wire 16 to a movement of accelerometer 32 that is rotational relative to the three dimensional Cartesian system 120 whose origin is defined by taut wire 16 and the plane of the taut wires fence in which it participates (see FIG. 7), and in a manner wherein it is amenable to being sensed in all the three axes of accelerometer 32.

In one version of the method, an additional step is provided—positioning of the accelerometer so that it is spatially inclined relative to the taut wire of the fence unto which it is connected (in the cited example depicted in FIGS. 1-7, positioning accelerometer 32 as it is spatially inclined relative to taut wire 16 in all its three axes—and see FIG. 7).

Reference is being made to FIG. 8. FIG. 8 constitutes a flow chart of an example of an algorithm for processing signals that are received from sensing assembly 30. For reasons of convenience, the algorithm is described hereinafter by referring to signals that are received from only one axis from the existing three axes of a multi-axis accelerometer, but any professional will appreciate the fact that such algorithms with slight well-known modifications are implementable for analyzing two or three signals in parallel (wherein the multi-axis accelerometer is a two-axis or a tri-axis accelerometer, accordingly).

Following initial stage 802, step 804—the measurement of the voltage level of the signal, is performed.

In the next stage—806, comparison of the voltage level to the level of a pre-set constant threshold is executed. If the level is lower than the threshold, a return (808) to the initial stage 802 is executed. If the level of the signal is higher than the threshold, stage 810 of measuring the signal's time width is executed.

In the next stage—812, comparison of the signal's time width to a pre-set constant threshold is executed. If the signal's time width is lower than the threshold, a return (814) to the initial stage 802 is executed. If the signal's time width is wider than the threshold, stage 816 of counting signals is executed.

In the next stage—818, there is performed a comparison of summing the number of signals that were counted to a pre-set constant threshold.

If the quantity of signals that were counted is lower than the threshold, stage 820 is executed—namely a measurement of the "time window" in which "a number of signals" was received. In the next stage—822, a comparison of the time window to the number of signals counted to a pre-set constant threshold is taking place. If the time window that was measured for a number of signals is shorter from the constant threshold, there is still concern for a warning and hence a return 824 to the initial stage 802 occurs. If the measured time window that was measured for a number of signals (as before) is longer than the constant threshold, the subject matter encountered is a slow phenomena that does not raise concern and thus stage 826 of zeroing (calibrating) the signal for warning (i. e., the signal is not being reckoned in the calculation of the number of signals), and hence return to the initial stage 802 is performed.

On the other hand, if at the cited stage 818, the comparison of the summation of the number of signals that were measured to a constant threshold points on a substantial and higher than the threshold amount, stage 828 is executed, wherein it is (similar to stage 820) a measuring of the time window in which the signals were received. In the next stage—830, there is also executed (similar to stage 820) a comparison of the time window that was measured to the constant threshold. If the time window that was measured is longer than the constant threshold, the subject matter encountered is a slow phenomena that does not raise concern and thus stage 826 of zeroing (calibrating) the signal for warning (i. e., the signal is not being reckoned in the calculation of the number of signals) is taking place, and hence return to the initial stage 802 is performed.

However, if the time window that was measured is smaller than the pre-set constant threshold—it indicates that there might be an intrusion warning.

From the instant that a warning is occurring, a continuum of warnings and processing starts—

In stage 832 an intensity warning is issued. In an intrusion detection fence in accordance with the invention, variations of tautness that occurred in the taut wire change the voltage levels that are received from the multi-axes accelerometer (in every one of its axes). The time in which the change of the voltage occurred is equivalent to the time span during which the change in the tautness of the fence taut wire occurred. In addition, in an intrusion detection fence in accordance with the invention, the number of signals (i. e., the electrical pulses) that the accelerometer generates (produces) in each one of its axes—and this due to the occurrence of vibrations in the taut wires, might be in the range from a single pulse to tens of pulses. The intensity of the pulse varies and depends on the measure of tautness in the taut wire and the intensity of the vibration phenomena that occurs in the taut wire (wherein a constant variation in the tautness of the wire would cause the production of a single, constant pulse). Hence, in the algorithm that we pointed at above, (before arriving at stage 832), measurements were conducted of the intensity (value) of the voltage and of the width in time of the pulses that were produced as a result of touching the wire or due to the vibrations of the taut wire. In accordance with the (constant) preset thresholds that were defined above regarding the intensity of the voltage, width of time of the pulse, quantity of the pulses and the size (magnitude) of the window in time, the algorithm determines whether it is a true warning or a false one.

In stage 834 a measurement of the polarity of the signals is executed. In an intrusion detection fence in accordance with the invention, variations of the tautness that occurred in the taut wire either right or left to the location of the accelerometer cause change of the polarity (positive or negative) of the voltage at the point of sampling. Hence, it is possible to determine the impact side in which the intrusion attempt occurred (namely the loading of the wire) in reference to the accelerometer position and in stage 836 a directional warning is given (e.g.—right or left to the accelerometer).

In stage 838 a multiplication of the levels of the voltages of the signals that were received by the square time width is performed. In an intrusion detection fence in accordance with the invention, the acceleration of the accelerometer is proportional to the voltage, thus when the capability to measure the time of the occurrence is given, it is possible to calculate the taut wire movement. Considering the aspects of the rigidity of the wires, it is possible to estimate the measure of bending of the wire and the opening formed accordingly, and, in stage 840—to add also a warning about the geometrical size of the break in.

In stage 842 the system reverts to the initial state 802.

Any professional would understand that the algorithm that was described above is solely one example from many of algorithms that can be implemented for the sake of processing the information that is received from a sensing assembly in accordance with the invention.

This and more—in an intrusion detection fence in accordance with the invention, it is possible to receive simultaneously and in parallel, to one (single) processing unit, signals from several accelerometers. Any professional would understand that when the accelerometers are not connected in series to the processing unit but rather in parallel, and when given the logical statistical fact that it is possible to locate time spans in which one accelerometer produces a signal whereas the others do not produce signals, and vice versa (and this even though the taut wires that are connected with them are loaded at the same time due to the intrusion attempt), then it is possible to receive, for an extended period, the signals from a multitude of accelerometers in parallel to one signal processing unit and to receive a specific warning regarding to each one of them—separately.

Thus, subject to what was described above while referring to the accompanying figures, any professional would appreciate the fact that rather important advantages that are not obtained nowadays from an intrusion detection of the taut wires type (e.g.—those we pointed at above in the "background of the invention" section) might be enabled as an outcome of the innovative implementation of a compact, multi-axes accelerometer serving as the sensor for the intrusion detection fence of the taut wire type and connecting it unto the taut wire to which it is allocated, by a mechanical means that from the instant of loading the taut wire (as occurs at a time of an attempted break-in through it) as said, will convert the motion of the wire to a movement of the accelerometer, that is amenable to be sensed in its axes.

Implementing the invention would enable to produce combined indications that are highly beneficial but unobtainable from known (existing) taut wire fences nowadays. Both in relation to the position (location) of the occurrence of the attempted intrusion in relation to the accelerometer (does it happen to the right of the sensor or on its left); as well as for identifying the specific (individual) accelerometer that warns—from among the group of sensors to which it belongs (for example—a group of sensors that is installed on a sensors' pole wherein it is connected to the processing unit in parallel); as well as in a dynamic manner and for prolonged times—regarding the varying weight unto which the wire is loaded during the time of the attempted break-in, its direction in spatial position and even estimating the geometrical path the wire traverses at the time that an intrusion through it is tried; and as well as also indications regarding instant of vibrations unto which the wire might be exposed due to an intrusion act through it.

Moreover, in view of the physical compactness of a sensor of the multi-axes accelerometer type, the implementation of the invention enables a crowded (tightly packed) deployment of taut wires while fully exhausting the ability to use—all of them—as "communication lines" (venues) that are active—all of them and simultaneously, for transferring indications regarding the occurrence of a penetration effort through them. In other words—sensors of the multi-axes accelerometer type in accordance with the invention, that are relatively small in their dimensions, enable positioning a large number of sensors along the sensors' pole, and accordingly receiving indications from a large number of wires in the fence.

Reference is being made to FIG. 9 and FIG. 10. FIG. 9 constitutes a close-up view of a second embodiment of a sensing assembly 930 that is installable on a sensors' pole 920 (a pole similar to sensors' pole 20 that is illustrated in FIG. 2). FIG. 10 constitutes an exploded view of the components of sensing assembly 930 that is illustrated in FIG. 9.

While in the configuration that was described above when referring to FIGS. 1 to 7, the multi-axes accelerometer was a three axes one (see ibid, component 32), in a sensing assembly 930 configuration a bi-axes (two-axes) accelerometer 932 is installed or, alternatively, a tri-axes accelerometer, wherein only signals received from it from two axes are used for processing (data), (for example, in accordance with the algorithm that we have pointed at above when referring to FIG. 8).

Accelerometer 932 that is installed in sensing assembly 930 is connected to wire 916 by movement converting means 940.

Sensing assembly 930 includes basis means 950 that includes a component 952 in a U shaped configuration. Component 952 is suited to be installed on a sensors' pole 20 by an assembly of screws 954.

Sensing assembly 930 includes as said movement converting means 940. In the illustrated configuration, movement converting means 940 includes spiral spring component 960, whose one end—962, is formed as a ring like item and is suited to be affixed by screw 964 (see FIG. 10) to component 952. The other end of spiral spring component 960-966, is formed wherein it protrudes and is perpendicular in its direction relative to the length wise axis 961 of spring 960. The spring edge 966 is also formed as a kind of a ring and is suited to anchor in its insides an end 968 of accelerometer 932 (in the illustrated example—a threaded end that is anchored to spring 932 by mans of a nut 972). The transition from the direction of length-wise axis 961 of spring 960, to the orthogonal direction whose end is 966, is provided through an arc-like region 970.

Spring 960 is suited to be affixed unto wire 916 by an array of intermediate linking means 974. In the illustrated example, array 974 includes a threaded stem 976 that is formed with a slot 978 to receive (accept) wire 916 into its inner space, nuts 982 and 984 and disc 986 that serve to anchor wire 916 within said stem 976 and to affix the threaded stem to spring 960 by fastening the threaded stem on the surface of arc-like region 970.

Thus, any professional would understand that from the instant of affixing spring 960 unto wire 916, movement converting means 940 is connected both to a fence wire and to the multi-axes accelerometer that is mounted on it in parallel to the direction of the fence wire 916 (see in FIG. 9 the direction of the X axis) and in a small distance from it, while movement converting means 940 is affixed to sensors' pole 920, in a manner wherein the length wise axis 961 of spring 960 is positioned in an acute angle ($\alpha$) to wire 916, that is found on a plane (see in FIG. 9 the plane that is defined by axes X and Y), that is orthogonal in its direction to sensors' pole 920 (see in the FIG. 9 the plane that is defined by axes X and Z).

Any professional would understand that what is being presented is solely an example, and the parallelism degree of accelerometer 932 relatively to the direction of fence wire 916, as well as the orthogonality degree of the plane on which angle $\alpha$ is defined relative to sensors' pole 920, must not necessarily be absolute, and it is sufficient that these dimensions would be substantially (accordingly) parallel and orthogonal (for example diversion of up to 15° is within the allowed tolerance range).

In this condition, from the instant of loading wire 916 (as happens in a case of attempted intrusion), movement converting means 940 would convert the shift (movement) of wire 916 into a movement of accelerometer 932, wherein it can be sensed in at least two of its axes (even when in the "paused" state, accelerometer 932 is positioned parallel to wire 916). From the instant of activating the device that the taut wire moves, spiral spring 960 instills a springy operation in a manner that upon termination of the movement, movement converting means 940 will revert to its original "paused" state.

Thus, in light of the example illustrated in FIGS. 9 and 10, any professional would understand that the invention can also be implemented by using bi-axes accelerometers (or while utilizing only two axes of a multi-axes accelerometers), wherein in the paused state the accelerometer is not mounted in a spatial inclination or in any inclination what so ever relative to the direction of the wire that is allocated to it (see e.g. the location of accelerometer 932 wherein it is installed in parallel to wire 916 and compare to the configuration of the tri-axes accelerometer 32 that is mounted as it is inclined in space, as we pointed at above when referring to FIGS. 1 to 7, above), and also the signal processing can be executed as per signals that are arriving from just two axes of the accelerometer (see above, when referring to FIG. 8).

Any professional would also understand that it is sufficient to exploit signals from two axes—Y and Z (see FIG. 9) for executing reliable data processing of signals generated due to intrusion occurrence (signals that were generated as a result of spreading the wire or bending it along the Z axis), and while ignoring and cancelling signals that are received as an out come of the wire movements in a direction that is perpendicular to the sensor' pole (along the Y axis), as those that are the outcome of, for example, gusts of winds or friction of an animal with the wire.

Any professional would understand that the present invention was described above only in a way of presenting examples, serving our descriptive needs and those changes or variants in the structure of the means that constitute a taut wire type of intrusion detection fence—which is the subject matter of the present invention, hence they would not be excluded from the framework of the invention.

In other words, it is feasible to implement the invention as it was described above while referring to the accompanying figures, also with introducing changes and additions that would not depart from the constructional characteristics of the invention, characteristics that are claimed herein under.

What is claimed is:

1. An intrusion detection fence of a taut wires type comprising:

two anchoring poles that are positioned at a distance from one another;

a plurality of wires that are stretched taut between said two anchoring poles;

at least one sensors' pole that is located between two said anchoring poles; and at least one sensor that is installed on said at least one sensors' pole, wherein said at least one sensor is linked with at least one of said plurality of wires for sensing phenomena that accompany an attempted intrusion through said fence;

wherein said intrusion detection fence is characterized by that;

said at least one sensor is a multi-axis accelerometer that is installed on said at least one sensors' pole and connected to said at least one of said plurality of wires via a movement converting means, which from an instant of loading said at least one of said plurality of wires as happens when an intrusion attempt through it occurs, converts a movement of said at least one of said plurality of wires to a movement of said at least one sensor that is amenable to be sensed by at least two axes of the multi-axis accelerometer.

2. The intrusion detection fence in accordance with claim 1, wherein said intrusion detection fence is characterized by that:

said at least one sensor is a tri-axis accelerometer that is installed on said at least one sensors' pole wherein it is inclined relative to said at least one of said plurality of wires to which it is connected; and wherein said movement converting means converts a movement of said at least one of said plurality of wires to a rotational movement of said at least one sensor that is amenable to be sensed in all three axes of the tri-axis accelerometer.

3. The intrusion detection fence in accordance with claim 2, wherein said at least one sensor is inclined in a spatial position relative to said at least one of said plurality of wires to which it is connected, in each and every one of its three axes.

4. The intrusion detection fence in accordance with claim 2, wherein said movement converting means comprises:

a component that is formed as a twisting stripe with two ends and a central segment;

connecting means for connecting said twisting stripe to said at least one of said plurality of wires; and anchoring means for anchoring said sensor on one of said two ends of said twisting stripe; and a springy axis means whose one end is installed on said central segment of said twisting stripe, and its other end is linked to said at least one sensors' pole;

wherein said rotational movement of said at least one sensor, as it occurs from an instant of movement of said at least one of said plurality of wires takes place around said springy axis means.

5. The intrusion detection fence in accordance with claim 4, wherein said springy axis means comprises:

an elastomeric component that instills springy action into said means, from said instant of movement of said at least one of said plurality of wires.

6. The intrusion detection fence in accordance with claim 1, wherein said intrusion detection fence is characterized by that:

said multi-axis accelerometer that is installed on said at least one sensors' pole substantially parallel to said at least one of said plurality of wires to which it is connected and at a distance from it; and wherein said movement converting means converts a movement of said at least one of said plurality of wires to a movement of said at least one sensor that is amenable to be sensed in at least two of said three axes.

7. The intrusion detection fence in accordance with claim 6, wherein said movement converting means comprises:

a spiral spring component formed with a first end that is suited to connecting with said at least one sensors' pole, and with a second end that is protruding and is orthogonal in its direction to a length-wise axis of said spiral spring component, and with an intermediate transition region from the direction of said length-wise axis to said second end;

linking means for linking said spiral spring component in the intermediate transition region to said at least one of said plurality of wires; and means for anchoring said at least one sensor to said end of the spiral spring component;

wherein said movement of said at least one sensor, as it occurs from an instant of movement of said at least one of said plurality of wires takes place around said spiral spring component while said spiral spring component instills springy action into said movement of said at least one of said plurality of wires.

8. A sensing assembly with a tri-axis accelerometer type sensor, to be used as a sensor in an intrusion detection fence of the taut wires type comprising:

base means for installing said assembly on a sensors' pole of said fence in a manner so that said tri-axis accelerometer would be installed wherein it is inclined relative to a taut wire to which it is allocated; and movement converting means, which from an instant that said taut wire is loaded as happens on occurrence of an intrusion attempt through it, converts the movement of said wire to a rotational movement of the tri-axis accelerometer that is amenable to be sensed in all three axes of the tri-axis accelerometer.

9. The sensing assembly with a tri-axis accelerometer type sensor in accordance with claim 8, wherein said tri-axis accelerometer is installed in a spatial position wherein said tri-axis accelerometer is inclined relative to said taut wire to which it is allocated in said all three axes.

10. The sensing assembly with a tri-axis accelerometer type sensor in accordance with claim 8, wherein said movement converting means comprises:

a component that is formed as a twisting stripe with two ends and a central segment;

connecting means for connecting said component to said taut wire; and anchoring means for anchoring said sensor on one of said two ends of said component; and a springy axis means whose one end is installed on said central segment of said component, and its other end is linked to said sensors' pole;

wherein said rotational movement of said tri-axis accelerometer, as it occurs from an instant of movement of said taut wire, takes place around said springy axis means.

11. The sensing assembly with a tri-axis accelerometer type sensor in accordance with claim 10, wherein said springy axis means comprises:

an elastomeric component that instills springy action into said means, from the instant of movement of said taut wire.

12. A sensing assembly with a multi-axis accelerometer type sensor, to be used as a sensor in an intrusion detection fence of the taut wires type, comprising base means for installing said assembly on a sensor's pole of said fence; and movement converting means that, from an instant a taut wire to which said sensor is allocated, is loaded as it happens on occurrence of an intrusion attempt through it, converts movement of said taut wire to a movement of said multi-axis accelerometer that is amenable to be sensed in at least two of its axes.

13. The sensing assembly with a multi-axis accelerometer type sensor in accordance with claim 12 wherein said multi-axis accelerometer is installed in a position wherein it is substantially parallel relative to said taut wire to which it is allocated in one of its axes and at a distance from it.

14. The sensing assembly with a multi-axis accelerometer type sensor in accordance with claim 12, wherein said movement converting means comprises:

a spiral spring component formed with a first end that is suited to connecting with said sensors' pole, wherein its second end is protruding and is orthogonal in its direction to a length-wise axis of said spiral spring component, and with an intermediate transition region from the direction to said length-wise axis to said second end;

linking means for linking said spiral spring component in the transition region to said taut wire; and means for anchoring said sensor to said end of said spiral spring component; wherein said movement of said sensor, as it occurs from an instant of movement of said taut wire, takes place around said spiral spring component while said spiral spring component instills springy action into said movement of said taut wire.

15. A method for sensing intrusion attempts through a taut wires type of intrusion detection fence, the method comprising the steps of:

connecting a multi-axis accelerometer to a taut wire of said taut wires type intrusion detection fence;

converting movement of said taut wire as it occurs when an intrusion attempt is taking place through it, to a movement of said multi-axis accelerometer that is amenable to be sensed in its axes.

16. The method for sensing intrusion attempts through a taut wires type of intrusion detection fence in accordance with claim 15, wherein the method comprises an additional step of:

positioning said multi-axis accelerometer wherein it's inclined relative to said taut wire to which it is connected.

* * * * *